(12) United States Patent
Kim (10) Patent No.: US 7,975,181 B2
(45) Date of Patent: Jul. 5, 2011

(54) DEVICE FOR TESTING A FUNCTION OF A DISPLAY PORT, AND SYSTEM AND METHOD FOR TESTING THE SAME

(75) Inventor: Taek-Young Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 12/415,994

(22) Filed: Mar. 31, 2009

(65) Prior Publication Data

US 2010/0011249 A1    Jan. 14, 2010

(30) Foreign Application Priority Data

Jul. 11, 2008    (KR) .......................... 10-2008-0067429

(51) Int. Cl.
*G06F 11/00*    (2006.01)
(52) U.S. Cl. ......................................................... 714/44
(58) Field of Classification Search ...................... 714/44
See application file for complete search history.

(56) References Cited

U.S. PATENT DOCUMENTS

| | | | |
|---|---|---|---|
| 6,819,114 B2 * | 11/2004 | Cheng et al. | 324/407 |
| 2007/0236243 A1 * | 10/2007 | Park et al. | 324/770 |
| 2008/0129713 A1 * | 6/2008 | Chen et al. | 345/204 |
| 2010/0090719 A1 * | 4/2010 | Peng et al. | 324/770 |
| 2010/0309392 A1 * | 12/2010 | Chen et al. | 348/790 |

FOREIGN PATENT DOCUMENTS

| | | |
|---|---|---|
| JP | 2006180119 | 7/2006 |
| KR | 1020030054654 | 7/2003 |
| KR | 1020070048346 | 5/2007 |

* cited by examiner

*Primary Examiner* — Michael C Maskulinski
(74) *Attorney, Agent, or Firm* — H.C. Park & Associates, PLC (57) ABSTRACT

A device is disclosed for testing the function of a display port. The device includes a display port transmitting part, a field programmable gate array, and a memory. The display port transmitting part transmits connecting signals to a display port timing controller mounted on a display panel. The field programmable gate array applies a test signal to the display port timing controller, and controls the connecting signals applied from the display port transmitting part to the display port timing controller. The memory has software that determines acceptance or rejection of the display port function based on data output from the display port timing controller in response to the connecting signals or the test signal.

20 Claims, 7 Drawing Sheets

DEVICE FOR TESTING A FUNCTION OF A DISPLAY PORT, AND SYSTEM AND METHOD FOR TESTING THE SAME

CROSS REFERENCE TO RELATED APPLICATION

This application claims priority from and the benefit of Korean Patent Application No. 2008-67429, filed on Jul. 11, 2008, which is hereby incorporated by reference for all purposes as if fully set forth herein.

BACKGROUND OF THE INVENTION

1. Field of the Invention

The present invention relates to a device, system and method for testing a function of a display port.

2. Discussion of the Background

Recently, display panels such as liquid crystal displays (LCDs), plasma display panels (PDPs), high-definition television (HDTVs), etc., have been developed, so that an interface for the display panels requires high capacity for transmitting image data.

In order to apply the interface to various display panels, a standard of the interface has been determined. The interface is classified as either an external interface or an internal interface. The external interface connects the display panel to multifunctional peripherals such as a driving unit. The internal interface connects internal elements of the display panel.

A standard for a conventional internal interface is a low voltage differential signaling (LVDS). In the LVDS, blocks for processing an analog signal and a digital signal are disposed on a scaler board to transmit digital data through a cable, which is digitalized by an analog-to-digital converter (ADC). The LVDS uses a low voltage of about 3.3 V or about 1.5 V, which are lower than a standard voltage of about 5 V. The LVDS uses a decreased number of wirings on a motherboard and a display panel that is widely used in various fields.

A standard for a conventional external interface is the Digital Visual Interface (DVI). In the DVI standard, an image is stored as digital data, and is displayed on a monitor of a computer.

Recently, a display port (DP) and a unified display interface (UDI) have been devised as the interface. The DP is a standard for a digital display interface issued by the Video Electronics Standards Association (VESA). In the DP, the internal interface is integrated with the external interface. When the internal interface is integrated with the external interface, a data bandwidth is increased so that three streams of 1080p display resolution may be transmitted through the data bandwidth of about 10.8 Gbps, which is greater than twice the data bandwidth of the DVI. Thus, a high resolution image may be transmitted.

In the display panel having the DP as the interface, the scaler board outputting a digital signal based on the signals from the DVI that is the external interface may be omitted. A DP timing controller is mounted on an internal printed circuit board (PCB) of the display panel instead of the scaler board, so that cost and size of the display panel are decreased.

An HDTV, projector, monitor, camcorder, etc., may be connected to each other through a computer using the DP. However, the DP function of the display panel may not be easily tested. For example, when the DP function is manually tested, a manufacturing time of the display panel is greatly increased.

SUMMARY OF THE INVENTION

The present invention provides a device for automatically testing a function of a display port.

The present invention also provides a system for testing the function of the display port.

The present invention also provides a method for testing the function of the display port.

Additional features of the invention will be set forth in the description which follows, and in part will be apparent from the description, or may be learned by practice of the invention.

The present invention discloses a device for testing a function of a display port that includes a display port transmitting part, a field programmable gate array, and a memory. The display port transmitting part transmits connecting signals to a display port timing controller mounted on a display panel. The field programmable gate array applies a test signal to the display port timing controller, and controls the connecting signals applied from the display port transmitting part to the display port timing controller. The memory has software that determines acceptance or rejection of the display port function based on data outputted from the display port timing controller in response to the connecting signals or the test signal.

The present invention also discloses a system for testing a function of a display port that includes a display panel, a device for testing the display port function and a display port cable. The display panel includes a display port timing controller. The device for testing the display port function includes a display port transmitting part, an field programmable gate array and a memory. The display port transmitting part transmits connecting signals to the display port timing controller. The field programmable gate array applies a test signal to the display port timing controller and controls the connecting signals applied from the display port transmitting part to the display port timing controller. The memory has software that determines acceptance or rejection of display port function based on data outputted from the display port timing controller in response to the connecting signals or the test signal. The display port cable connects the display port timing controller with the device for testing the display port function.

The present invention also discloses a method of testing a function of a display port. A power on or off test is selected. A first test signal having a power on or off pulse is applied to a display port timing controller mounted on a display panel. First data is outputted from the display port timing controller based on the first test signal. Normality of the power on or off of the display panel is tested based on the first data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Exemplary embodiments of the invention are described herein with reference to cross-sectional illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, exemplary embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be explained in detail with reference to the accompanying drawings.

Figure 1:
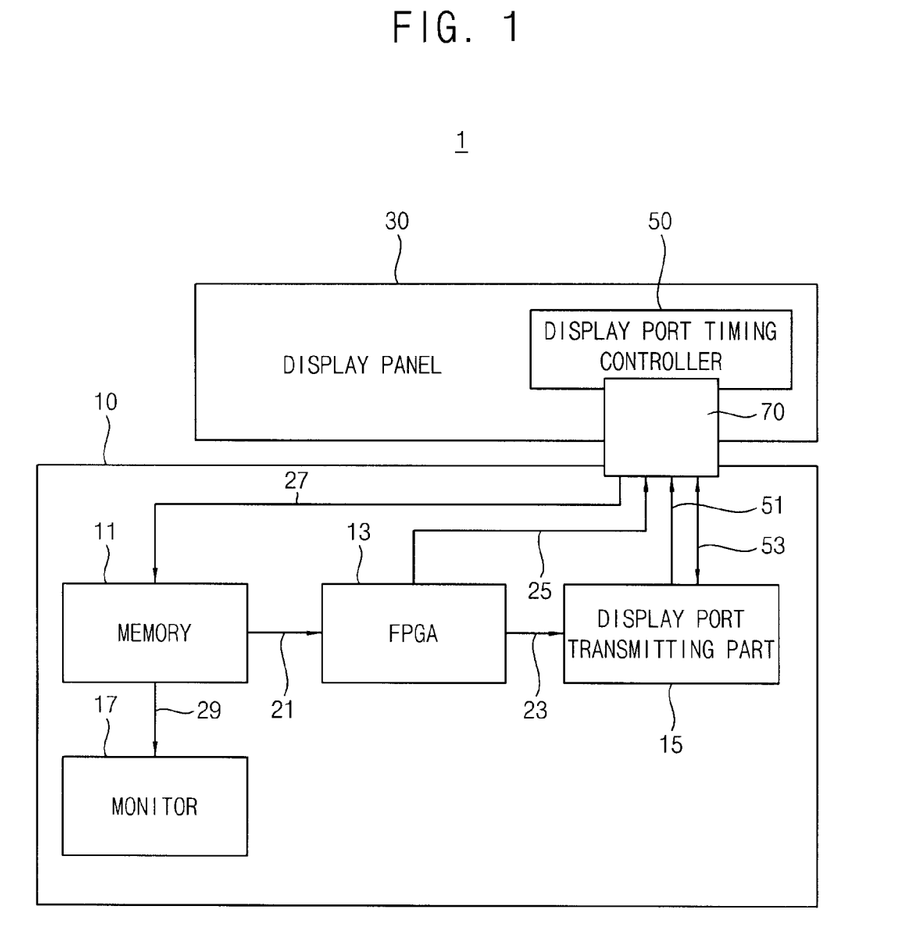
FIG. 1 is a block diagram illustrating a system for testing a function of a display port in accordance with an exemplary embodiment of the present invention.

FIG. 1 is a block diagram illustrating a system for testing a function of a display port in accordance with an exemplary embodiment of the present invention.

Referring to FIG. 1, the system 1 for testing the function of the display port includes a display panel 30, a display port function testing unit 10 and a display port cable 70. A display port timing controller 50 is mounted on an internal printed circuit board (PCB) of the display panel 30. The display port cable 70 connects the display port timing controller 50 to the display port testing unit 10.

The display port function testing unit 10 includes a memory 11, a field programmable gate array (FPGA) 13, and a display port transmitting part 15. The display port function testing unit 10 is connected to the display port timing controller 50 of the display panel 30 to test the function of the display port. In FIG. 1, the memory 11 and the FPGA 13 are shown in different blocks. Alternatively, the memory 11 may be integrated with the FPGA 13.

The memory 11 has software that selects the test of the function of the display port and transmits a start signal 21 of the selected test to the FPGA 13. Also, the software determines acceptance or rejection of the test of the function of the display port based on the result data 27 outputted from the display port timing controller 50.

The FPGA 13 applies a test signal 25 to the display port timing controller 50 or controls connecting signals transmitted from the display port transmitting part 15 to the display port timing controller 50 based on the start signal 21 of the selected test. The display port transmitting part 15 transmits the connecting signals to the display port timing controller 50 through a main channel 51 and an auxiliary channel 53. The connecting signals include main link signals and control signals. The main link signals connect the display port timing controller 50 to the display port transmitting part 15, and are applied to the display port timing controller 50 through the main channel 51. The control signals of the connecting signals control the display port timing controller 50, and are applied to the display port timing controller 50 through the auxiliary channel 53. The display port function testing unit 10 may further include a monitor 17. The monitor 17 displays a result of the acceptance or rejection of the function of the display port, which is determined by the software stored in the memory 11.

The items for testing the function of the display port, which is selected by the software, may be selected, added or deleted. For example, the testing items may include a power on/off test for testing power on/off function of the display panel 30, a luminance up/down test for testing luminance up/down function of the display panel 30, an error mode transition test for testing error mode transition function of the display panel 30, a low power mode transition test for testing a low power mode transition function of the display panel 30, a built-in self-test (BIST) for testing BIST function of the display panel 30, a safe mode transition test for testing a safe mode transition function of the display panel 30, and a diagnostic mode transition test for testing a diagnostic mode transition function of the display panel 30.

When the power on/off test is selected by the software, the memory 11 applies the start signal 21 for testing the power on/off to the FPGA 13. The FPGA 13 applies the power on/off test signal 25 to the display port timing controller 50 based on the start signal 21 of the power on/off test.

Figure 2:
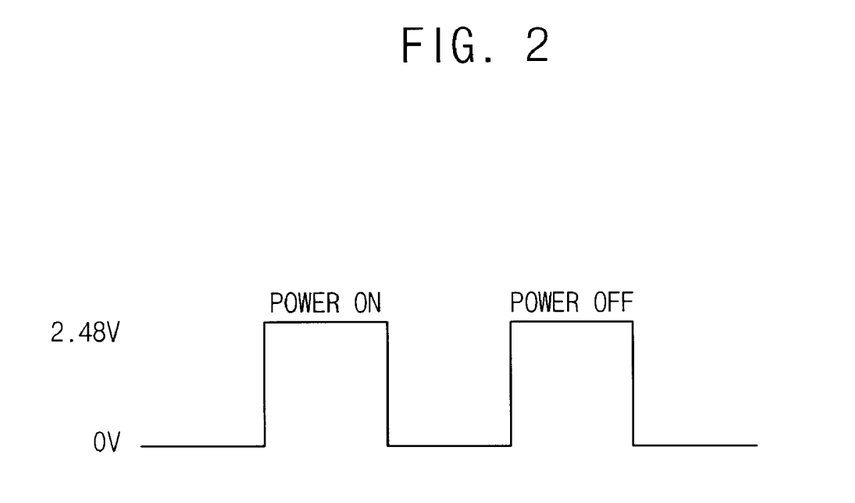
FIG. 2 is a waveform diagram illustrating power on or off test signals in accordance with an exemplary embodiment of the present invention.

For example, the test signal 25 for testing the power on/off, which is applied to the display port timing controller 50, may be a pulse signal shown in FIG. 2.

FIG. 2 is a waveform diagram illustrating power on/off test signals in accordance with an exemplary embodiment of the present invention.

Referring to FIG. 2, when a pulse signal of about 2.48 V is applied to the display panel 30, power of the display panel 30 is "on", to display an image. When the pulse signal of about 2.48 V is subsequently applied to the display panel 30, the power of the display panel 30 is "off".

The display port timing controller 50 outputs result data 27 to the software based on the power on/off operation of the display panel 30. The result data 27 may be a pulse signal based on the power on/off test signal 25.

The software analyzes the result data 27 outputted from the display port timing controller 50 to determine the normality of the power on/off function of the display panel 30. The result 29 of the determination may be transmitted to the monitor 17. The result 29 is then displayed on the monitor 17.

When the luminance up/down test is selected by the software, the start signal 21 for the luminance up/down test is applied to the FPGA 13 by the software. The FPGA 13 applies a test signal 25 for testing the luminance up/down test to the display port timing controller 50 based on the start signal 21 of the luminance up/down test.

The luminance up/down test signal 25 that is applied to the display port timing controller 50 by the FPGA 13 may be a pulse signal having variable duties that may be changed stepwise. The duty may be (B/A)×100(%), wherein A and B represent a period of the pulse signal and a width of a high state of the pulse signal, respectively, as shown in FIG. 3.

Figure 3:
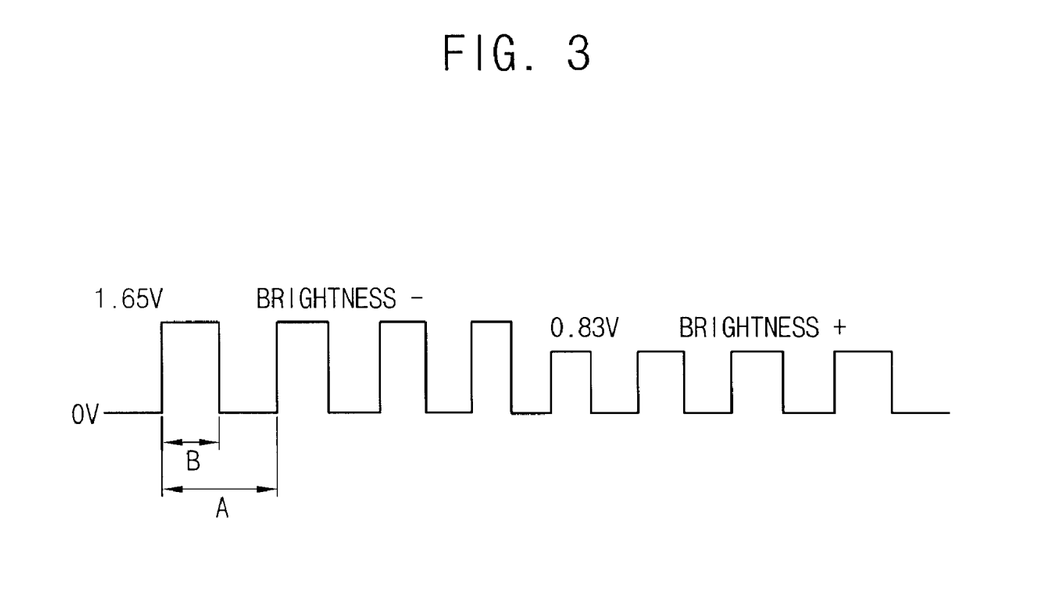
FIG. 3 is a waveform diagram illustrating luminance up or down test signals in accordance with an exemplary embodiment of the present invention.

FIG. 3 is a waveform diagram illustrating luminance up/down test signals in accordance with an exemplary embodiment of the present invention.

Referring to FIG. 3, the luminance down test signal may be a pulse signal of about 1.65 V, and the luminance up test signal may be a pulse signal of about 0.83 V.

In the luminance up/down test, the pulse signals having stepwise changed duties are applied, and the number of pulse signal duty steps may be changed. For example, the luminance "down" pulse signals may have five steps and the luminance "up" pulse signals may have five steps, so that pulse signals having ten steps may be used for the luminance up/down test.

When the duties of the pulse signals have ten steps, for example, the first luminance level may have a duty of about 61%, the second luminance level may have a duty of about 65%, the third luminance level may have a duty of about 69%, the fourth luminance level may have a duty of about 73%, the fifth luminance level may have a duty of about 77%, the sixth luminance level may have a duty of about 81%, the seventh luminance level may have a duty of about 85%, the eighth luminance level may have a duty of about 89%, the ninth luminance level may have a duty of about 93%, the tenth luminance level may have a duty of about 97%, and the eleventh luminance level may have a duty of about 100%.

The luminance of the display panel 30 may be increased or decreased based on the duties of the luminance up/down test signal 25 applied to the display port timing controller 50. For example, in the luminance up/down test, the luminance may gradually decrease from the maximum level 11 to the minimum level 1, and then gradually increase from level 1 to level 11.

The display port timing controller 50 outputs the result data 27 to the software based on the luminance up/down of the display panel 30. The result data 27 may be the pulse signal based on the inputted luminance up/down test signal 25.

The software stores reference data of the luminance up/down. The software compares the duty of the result data 27 and the stored reference data based on the data 27 outputted from the display port timing controller 50. Thus, the normality of the luminance up/down on the display panel 30 is determined. The result 29 of the determination of the luminance up/down may be transmitted to the monitor 17. The result 29 is then displayed on the monitor 17.

When the error mode transition test is selected by the software, the software applies a start signal 21 for testing the error mode transition to the FPGA 13. The FPGA 13 applies the test signal 25 having a frequency out of a normal range to the display port timing controller 50 based on the start signal 21 of the error mode transition test.

When the frequency of the test signal 25 is out of the normal range, the display panel 30 is changed into the error mode. When the display panel 30 is changed into the error mode, the display panel 30 maintains a black pattern for about 15 seconds and is changed into a power saving mode.

When the display panel 30 is changed into the error mode, the display port timing controller 50 outputs to the result data 27 to the software.

The software analyzes the result data 27 outputted from the display port timing controller 50 to test the transition of the error mode of the display panel 30. When the display panel 30 is changed into the error mode in response to the test signal 25 having a frequency out of the normal range, the result of the error test of the display port timing controller 50 is acceptance.

The result 29 is transmitted into the monitor 17. The result 29 is then displayed on the monitor 17.

When the low power mode transition test is selected by the software, the software applies a start signal 21 of the low power mode transition to the FPGA 13. The FPGA 13 controls the display port transmitting part 15 to block the main link signals transmitted to the display port timing controller 50 based on the start signal 21 of the low power mode transition test.

When the main link signals are blocked, the display panel 30 is changed into the low power mode. When the display panel 30 is changed into the low power mode, the display panel 30 maintains a black pattern for about 15 seconds and is changed into the power saving mode.

When the display panel 30 is changed into the low power mode, the display port timing controller 50 outputs the result data 27 to the software.

The software analyzes the data 27 outputted from the display port timing controller 50 to determine the result of the low power mode transition test of the display panel 30. When the main link signals are blocked in the display panel 30 of the low power mode, the result of the low power mode transition test of the display port function is acceptance.

The result 29 is transmitted to the monitor 17. The result 29 is then displayed on the monitor 17.

When the BIST mode is selected by the software, the software applies the start signal 21 of the BIST mode transition test to the FPGA 13. The FPGA 13 controls the display port transmitting part 15 to block the control signals transmitted by the display port transmitting part 15 to the display port timing controller 50 based on the start signal 21 of the BIST mode transition test.

When the control signals are blocked, the display panel 30 determines that the display port cable is not connected and is changed into the BIST mode. When the display panel 30 is changed into the BIST mode, the display panel 30 displays a white image, a black image, a red image, a green image, and a blue image for two seconds for each color, respectively.

When the display panel 30 is changed into the BIST mode, the display port timing controller 50 outputs the result data 27 to the software.

The software analyzes the data 27 outputted from the display port timing controller 50 to determine the result of the BIST mode transition test of the display panel 30. When the control signals are blocked in the display panel 30 of the BIST mode, the result of the BIST mode transition test of the display port function is acceptance.

The result 29 is transmitted to the monitor 17. The result 29 is then displayed on the monitor 17.

When the safe mode transition test is selected by the software, the software applies the start signal 21 of the safe mode transition test to the FPGA 13. The FPGA 13 applies a test signal 25 for starting video distribution amplification (VDA) of an image to the display port timing controller 50 based on the start signal 21 of the safe mode transition test.

When the test signal 25 of the VDA is applied to the display port timing controller 50, the display panel 30 is changed into the safe mode. When the display panel 30 is changed into the safe mode, the display panel 30 displays the image of the VDA resolution.

When the display panel 30 is changed into the safe mode, the display port timing controller 50 outputs the result data 27 to the software.

The software analyzes the data 27 outputted from the display port timing controller 50 to determine the result of the safe mode transition test of the display panel 30. When the test signal of the VDA start is applied to the display panel 30 of the safe mode, the result of the safe test mode transition test of the DP function is acceptance.

The result 29 is transmitted to the monitor 17. The result 29 is then displayed on the monitor 17.

When the diagnostic mode transition test is selected by the software, the software applies the start signal 21 of the diagnostic mode transition test to the FPGA 13. The FPGA 13 applies the test signal 25 of the diagnostic pulse to the display port timing controller 50 based on the start signal 21 of the diagnostic mode transition test.

When the test signal 25 of the diagnostic pulse is applied to the display port timing controller 50, the display panel 30 is changed into the diagnostic mode.

When the display panel 30 is changed into the diagnostic mode, the display port timing controller 50 outputs the result data 27 to the software.

The software analyzes the result data 27 outputted from the display port timing controller 50 to determine the result of the diagnostic mode transition test of the display panel 30. When the test signal 25 of the diagnostic pulse is applied to the display panel 30 of the diagnostic mode, the result of the diagnostic mode transition test of the display port function is acceptance.

The result 29 is transmitted to the monitor 17. The result 29 is then displayed on the monitor 17.

Alternatively, a portion of the items of the tests may be selected, and other test items may be added to the display port function by modifying the software.

Figure 4:
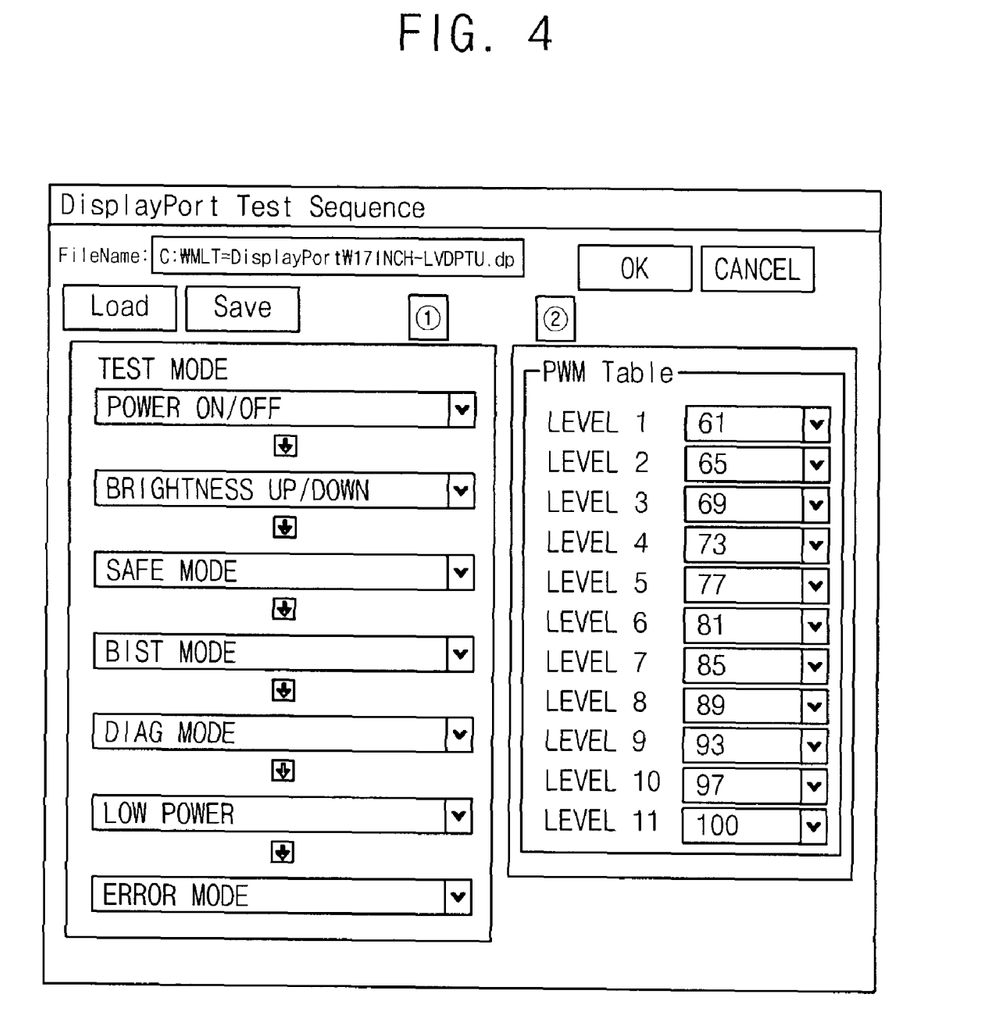
FIG. 4 is an image displayed on a monitor by setting to test a function of a display port in accordance with an exemplary embodiment of the present invention.

FIG. 4 is an image displayed on a monitor by setting a display port to a function test in accordance with an exemplary embodiment of the present invention.

Referring to FIG. 4, the items of the display port function test including the power on/off test, the luminance up/down test, the safe mode transition test, the BIST mode transition test, the diagnostic mode transition test, the low power mode transition test, and the error mode transition test are performed, in sequence.

The order of the items of the tests may be changed by modifying the software, and a portion of the items of the tests may be selected or omitted. In the present embodiment, the duty level numbers are from 1 to 11 in the luminance up/down test. Alternatively, the duty level numbers in the luminance up/down test may be changed.

Figure 5:
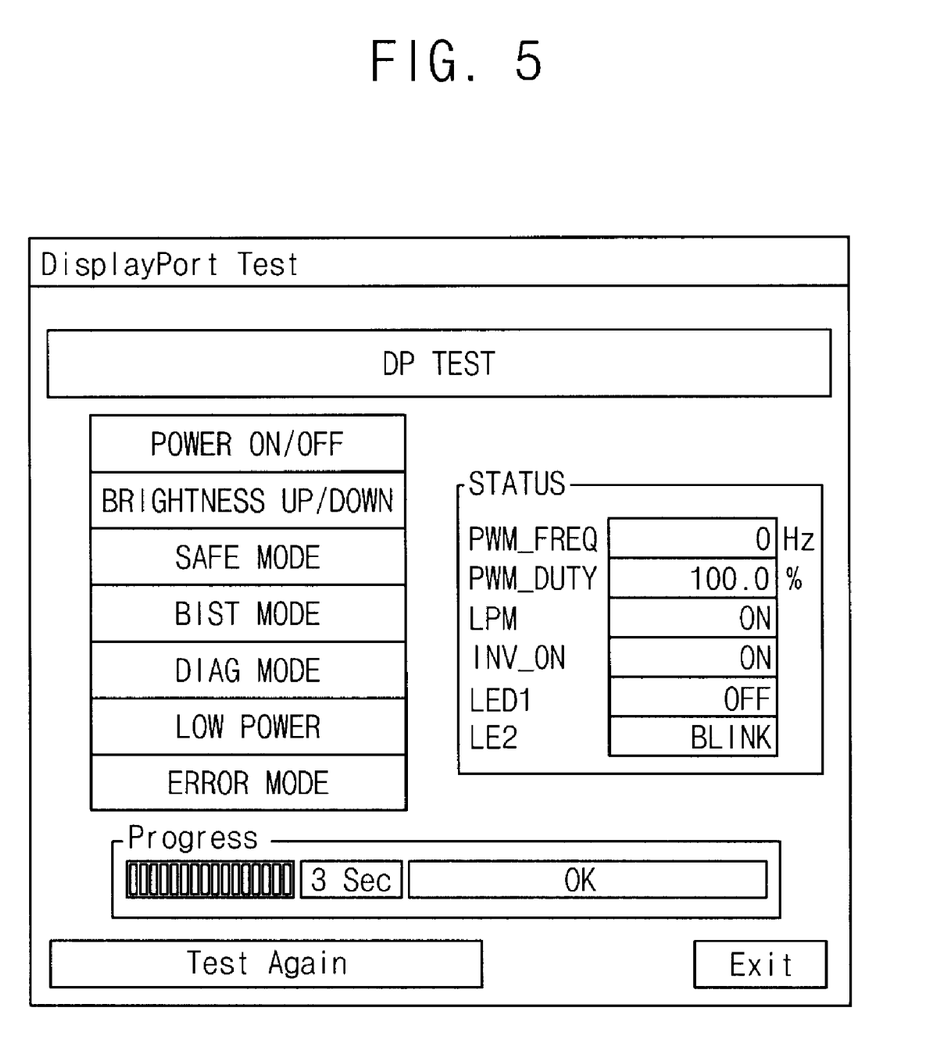
FIG. 5 is an image displayed on the monitor when the display port of FIG. 4 has passed the test to be an acceptance.

FIG. 5 is an image displayed on the monitor when the display port of FIG. 4 has passed the test, to be an acceptance.

Referring to FIG. 5, when the result of the display port function test is acceptance, an "OK" message is displayed on a lower portion of the monitor 17. When the OK message is displayed on the lower portion of the monitor 17, the test may be repeated or terminated.

Figure 6:
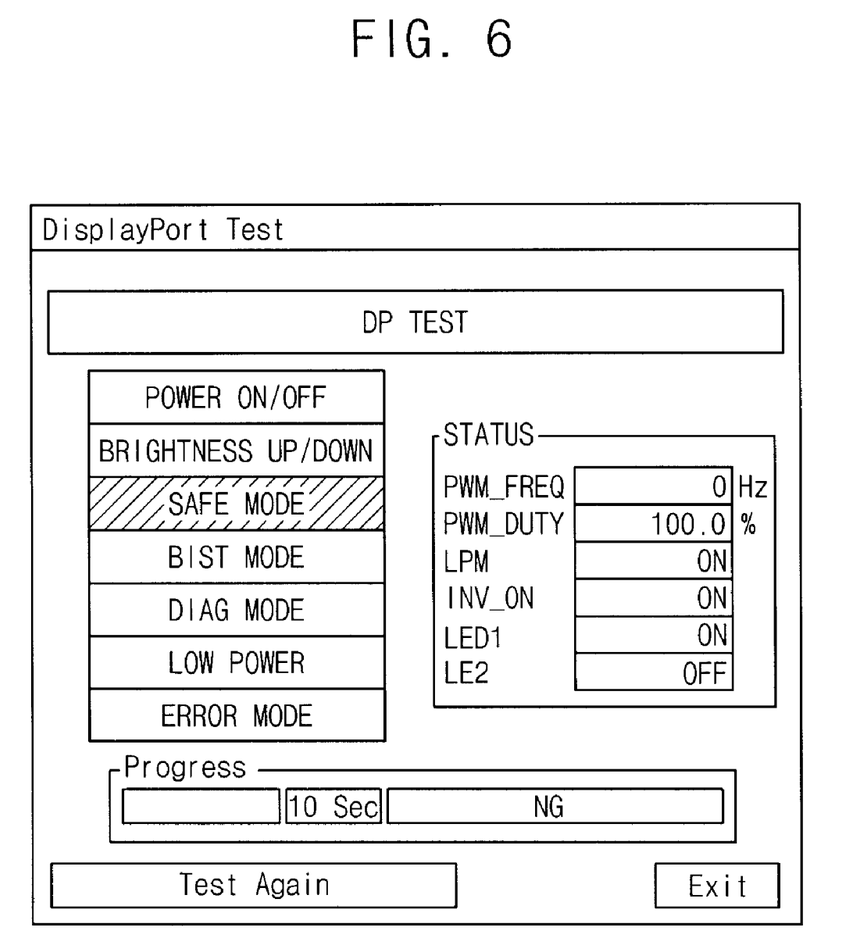
FIG. 6 is an image displayed on the monitor when the display port of FIG. 4 has not passed the test to be a rejection.

FIG. 6 is an image displayed on the monitor when the display port of FIG. 4 has not passed the test, to be a rejection.

Referring to FIG. 6, the result of the safe mode transition test of the display port function test is a rejection. When one item of the display port function test is rejected, an "NG" message is displayed on the lower portion of the monitor 17. When the NG message is displayed on the lower portion of the monitor 17, the test may be repeated or terminated.

In another embodiment, the display port function test is manually performed, so that a test signal is applied to a board in every step and the test result is displayed on an externally provided keypad. However, in the present embodiment, the display port function test is performed by the device for testing the display port function, so that an automated test of the display port function is performed without the externally provided keypad during a manufacturing process of the display panel 30.

Figure 7A:
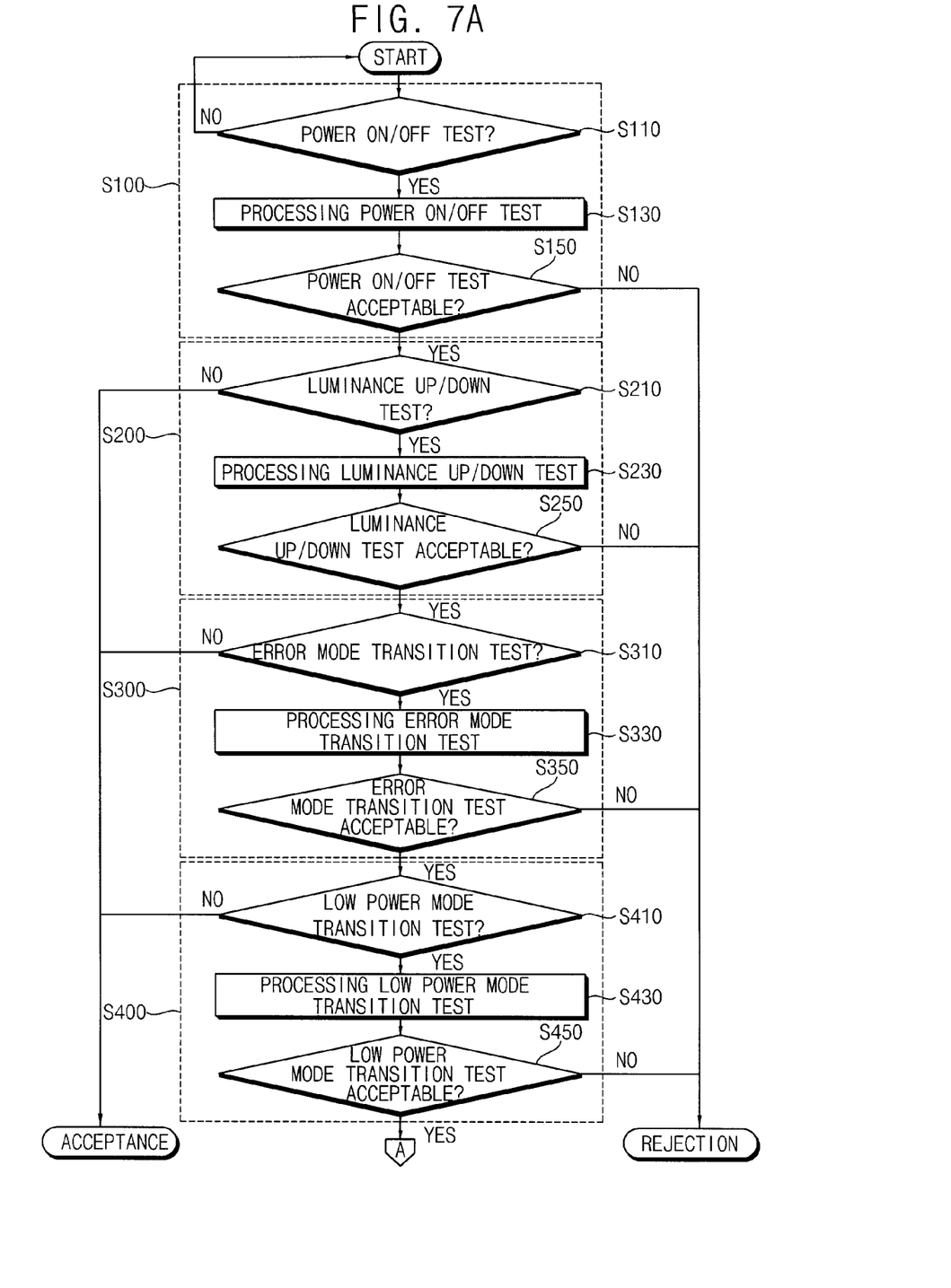
FIG. 7A and FIG. 7B are flow charts illustrating a method of testing a function of a display port in accordance with an exemplary embodiment of the present invention.
Figure 7B:
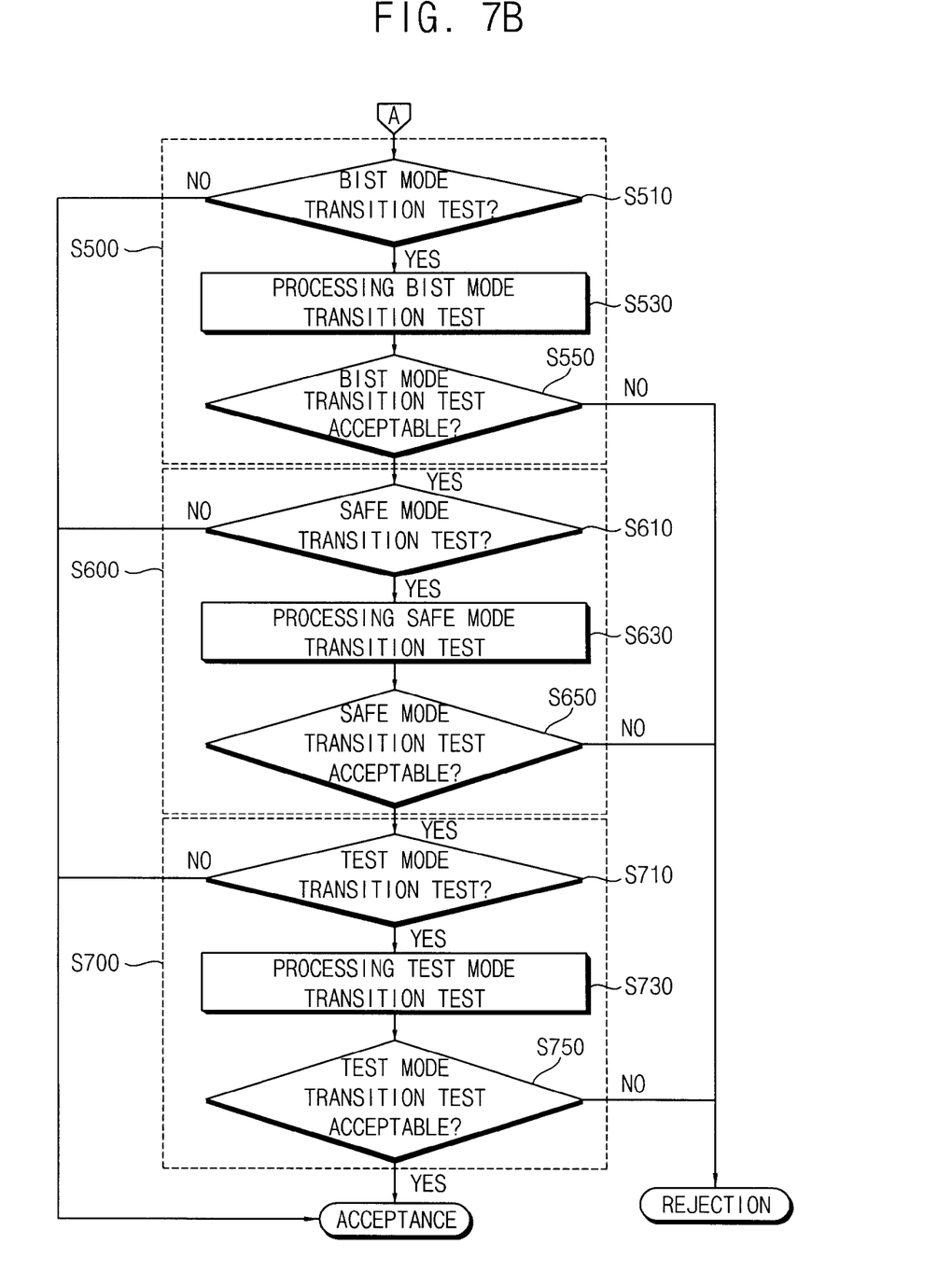

FIG. 7A and FIG. 7B are flow charts illustrating a method of testing a function of a display port in accordance with an exemplary embodiment of the present invention.

Referring to FIG. 7A and FIG. 7B, the items for testing the display port function include the power on/off test (step S100), the luminance up/down test (step S200), the error mode transition test (step S300), the low power mode transition test (step S400), the BIST mode transition test (step S500), the safe mode transition test (step S600), and the diagnostic mode transition test (step S700).

The order of the items of the tests shown in FIG. 7A and FIG. 7B may be changed by modifying the software stored in the memory 11 (shown in FIG. 1), and a portion of the testing items may be selected or omitted. Also, new items for testing the display port function may be added.

Hereinafter, the method of testing the display port function will be explained with reference to FIG. 1, FIG. 2, FIG. 3, FIG. 4, FIG. 5, FIG. 6, FIG. 7A, and FIG. 7B.

When the test of the display port function is started, the selection of the power on/off test is checked (step S110). When the power on/off test is not selected, the display port function testing unit 10 (shown in FIG. 1) waits until the power on/off test is selected.

When the power on/off test is selected, the power on/off test is processed (step S130). For example, the start signal 21 of the power on/off test is applied to the FPGA 13 by the software. The FPGA 13 applies the test signal 25 of the power on/off test to the display port timing controller 50 based on the start signal 21 of the power on/off test.

For example, the power on/off test signal 25 applied to the display port timing controller 50 by the FPGA 13 may include the pulse signal shown in FIG. 2. For example, when the pulse signal of about 2.48 V is firstly applied to the display port timing controller 50, the power of the display panel 30 is "on" to display the image. When the pulse signal of about 2.48 V is secondly applied to the display port timing controller 50, the power of the display panel 30 is "off".

The display port timing controller 50 outputs the result data 27 to the software based on the result of the power on/off of the display panel 30. The output result data 27 may include the pulse signal based on the input power on/off test signal 25.

The software analyzes the result data 27 outputted from the display port timing controller 50 to determine the power on/off function of the display panel 30. Thus, the software determines the acceptance or rejection of the power on/off function test of the display port function (step S150). The result 29 is transmitted to the monitor 17. The result 29 is then displayed on the monitor 17.

When the power on/off test is rejected, the result of the display port function test is the rejection. When the result of the power on/off test is acceptance, the next test is performed.

The selection of the luminance up/down test is checked (step S210). When the luminance up/down test is not selected, the result of the display port function test is acceptance. When the luminance up/down test is selected, the luminance up/down test is processed (step S230).

For example, if the luminance up/down test is processed, the software applies the start signal 21 of the luminance up/down test to the FPGA 13. The FPGA 13 applies the test signal 25 of the luminance up/down test to the display port timing controller 50.

The test signal 25 of the luminance up/down test applied to the display port timing controller 50 by the FPGA 13 may be the pulse signal having the stepwisely changed duties as shown in FIG. 3. The duty may be (B/A)×100(%), wherein A and B represent a period of the pulse signal and a width of a high state of the pulse signal, respectively. For example, the luminance down test signal may be the pulse signal of about 1.65 V, and the luminance up test signal may be the pulse signal of about 0.83 V.

In the luminance up/down test, the pulse signals having stepwisely changed duties are applied, and the number of the steps of the duties of the pulse signals may be changed. For example, the luminance down pulse signals may have five steps and the luminance up pulse signals may have five steps, so that the pulse signals having ten steps may be used for the luminance up/down test.

The luminance of the display panel 30 may be increased or decreased based on the duties of the luminance up/down test signal 25 applied to the display port timing controller 50. The display port timing controller 50 outputs the result data 27 to the software based on the luminance up/down of the display panel 30. The result data 27 may be the pulse signal based on the input luminance up/down test signal 25.

The software stores reference data of the luminance up/down. The software compares the duty of the result data 27 and the stored reference data based on the result data 27 outputted from the display port timing controller 50.

Thus, the normality of the luminance up/down on the display panel 30 is determined. That is, the software determines the acceptance or rejection of the luminance up/down test of the display port function based on the output result data 27 (step S250). The result 29 of the determination of the luminance up/down test may be transmitted to the monitor 17. The result 29 is then displayed on the monitor 17.

When the result of the luminance up/down test is rejection, the result of the display port function test is rejection. When the result of the luminance up/down test is acceptance, the next test is processed.

The selection of the error mode transition test is checked (step S310). When the error mode transition test is not selected, the result of the display port function is acceptance. When the error mode transition test is selected, the error mode transition test is processed (step S330).

When the error mode transition test is selected by the software, the software applies a start signal 21 for testing the error mode transition to the FPGA 13. The FPGA 13 applies the test signal 25 having a frequency out of a normal range to the display port timing controller 50 based on the start signal 21 of the error mode transition test.

When the frequency of the test signal 25 is out of the normal range, the display panel 30 is changed into the error mode. When the display panel 30 is changed into the error mode, the display panel 30 maintains a black pattern for about 15 seconds and is changed into a power saving mode.

When the display panel 30 is changed into the error mode, the display port timing controller 50 outputs the result data 27 to the software.

The software analyzes the result data 27 outputted from the display port timing controller 50 to test the transition of the error mode of the display panel 30. That is, the software determines the acceptance or rejection of the error mode transition test of the display port function based on the result data 27 (step S350).

When the display panel 30 is changed into the error mode in response to the test signal 25 having the frequency out of the normal range, the error test result of the display port timing controller 50 is acceptance. The result 29 is transmitted into the monitor 17. The result 29 is then displayed on the monitor 17.

When the error mode transition test result is rejection, the display port function test result is rejection. When the error mode transition test result is acceptance, the next test is processed.

The selection of the low power mode transition test is checked (step S410). When the low power mode transition test is not selected, the display port function test result is acceptance. When the low power mode transition test is selected, the low power mode transition test is processed (step S430).

For example, when the low power mode transition test is selected by the software, the software applies a start signal 21 of the low power mode transition to the FPGA 13. The FPGA 13 controls the display port transmitting part 15 to block the main link signals transmitted to the DP timing controller 50 based on the start signal 21 of the low power mode transition test.

When the main link signals are blocked, the display panel 30 is changed into the low power mode. When the display panel 30 is changed into the low power mode, the display panel 30 maintains a black pattern for about 15 seconds and is changed into the power saving mode.

When the display panel 30 is changed into the low power mode, the display port timing controller 50 outputs the result data 27 to the software.

The software analyzes the result data 27 outputted from the DP timing controller 50 to determine the result of the low power mode transition test of the display panel 30. That is, the software determines the acceptance or rejection of the low power mode transition test of the DP function based on the output result data 27 (step S450).

When the main link signals are blocked in the display panel 30 of the low power mode, the low power mode transition test result of the display port function is acceptance. The result 29 is transmitted to the monitor 17. The result 29 is then displayed on the monitor 17.

When the low power mode transition test is rejected, the display port function test result is rejection. When the error mode transition test result is acceptance, the next test is processed.

The selection of the BIST mode transition test is checked (step S510). When the BIST mode transition test is not selected, the display port function test result is acceptance. When the BIST mode transition test is selected, the BIST mode transition test is processed (step S530).

When the BIST mode is selected by the software, the software applies the start signal 21 of the BIST mode transition test to the FPGA 13. The FPGA 13 controls the display port transmitting part 15 to block the control signals transmitted by the display port transmitting part 15 to the display port timing controller 50 based on the start signal 21 of the BIST mode transition test.

When the control signals are blocked, the display panel 30 determines that the display port cable is not connected and is changed into the BIST mode. When the display panel 30 is changed into the BIST mode, the display panel 30 displays a white image, a black image, a red image, a green image, and a blue image for two seconds for each color, respectively.

When the display panel 30 is changed into the BIST mode, the display port timing controller 50 outputs the result data 27 to the software.

The software analyzes the result data 27 outputted from the display port timing controller 50 to determine the result of the BIST mode transition test of the display panel 30. That is, the software determines the acceptance or rejection of the BIST mode transition test of the display port function based on the output result data 27 (step S550).

When the control signals are blocked in the display panel 30 of the BIST mode, the BIST mode transition test result of the display port function is acceptance. The result 29 is transmitted to the monitor 17. The result 29 is then displayed on the monitor 17.

When the BIST mode transition test is rejected, the display port function test result is rejection. When the BIST mode transition test result is acceptance, the next test is processed.

The selection of the safe mode transition test is checked (step S610). When the safe mode transition test is not selected, the display port function test result is acceptance. When the safe mode transition test is selected, the safe mode transition test is processed (step S630).

When the safe mode transition test is selected by the software, the software applies the start signal 21 of the safe mode transition test to the FPGA 13. The FPGA 13 applies a test signal 25 for starting VDA of an image to the display port timing controller 50 based on the start signal 21 of the safe mode transition test.

When the test signal 25 of the VDA is applied to the display port timing controller 50, the display panel 30 is changed into the safe mode. When the display panel 30 is changed into the safe mode, the display panel 30 displays the image of the VDA resolution.

When the display panel 30 is changed into the safe mode, the display port timing controller 50 outputs the result data 27 to the software. The software analyzes the data 27 outputted from the display port timing controller 50 to determine the result of the safe mode transition test of the display panel 30. That is, the software determines the acceptance or rejection of the safe mode transition test of the display port function based on the output result data 27 (step S650).

When the test signal of the VDA start is applied to the display panel 30 of the safe mode, the safe test mode transition test result of the display port function is acceptance. The result 29 is transmitted to the monitor 17. The result 29 is then displayed on the monitor 17.

When the safe mode transition test result is rejection, the display port function test result is rejection. When the safe mode transition test result is acceptance, the next test is processed.

The selection of the diagnostic mode transition test is checked (step S710). When the diagnostic mode transition test is not selected, the display port function test result is acceptance. When the diagnostic mode transition test is selected, the diagnostic mode transition test is processed (step S730).

When the diagnostic mode transition test is selected by the software, the software applies the start signal 21 of the diagnostic mode transition test to the FPGA 13. The FPGA 13 applies the test signal 25 of the diagnostic pulse to the display port timing controller 50 based on the start signal 21 of the diagnostic mode transition test.

When the test signal 25 of the diagnostic pulse is applied to the display port timing controller 50, the display panel 30 is changed into the diagnostic mode. When the display panel 30 is changed into the diagnostic mode, the display port timing controller 50 outputs the result data 27 to the software.

The software analyzes the data 27 outputted from the DP timing controller 50 to determine the result of the diagnostic mode transition test of the display panel 30. That is, the software determines the acceptance or rejection of the diagnostic mode transition test of the display port function based on the output result data 27 (step S750).

When the test signal 25 of the diagnostic pulse is applied to the display panel 30 of the diagnostic mode, the diagnostic mode transition test result of the display port function is acceptance. The result 29 is transmitted to the monitor 17. The result 29 is then displayed on the monitor 17.

When the diagnostic mode transition test is rejected, the display port function test result is rejection. When the diagnostic mode transition test result is acceptance, the display port function test result is acceptance.

An image corresponding to the acceptance of the display port function test is substantially the same as the image of FIG. 5. An image corresponding to the rejection of the display port function test is substantially the same as the image of FIG. 6.

The items of the tests may be changed by modifying the software stored in the memory 11 (shown in FIG. 1), and a portion of the items of the tests may be selected or omitted. Also, a new item for testing the display port function may be added.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A device for testing a display port function, the device comprising:
   a display port transmitting part to transmit connecting signals to a display port timing controller mounted on a display panel;
   a field programmable gate array to apply a test signal to the display port timing controller and to control the connecting signals applied from the display port transmitting part to the display port timing controller; and
   a memory comprising a software that determines acceptance or rejection of the display port function based on data outputted from the display port timing controller, the data being output in response to the connecting signals or the test signal.

2. The device of claim 1, further comprising a monitor to display a result of a determination of the display port function, is the determination being made by the software.

3. The device of claim 1, wherein when a power on/off test is selected by the software, the field programmable gate array applies the test signal comprising a power on/off pulse to the display port timing controller to test normality of the power on/off of the display panel.

4. The device of claim 1, wherein when a luminance up/down test is selected by the software, the field programmable gate array applies the test signal to the display port timing controller to test normality of the luminance up/down of the display panel, the test signal comprising a pulse having variable duties that may be stepwisely changed.

5. The device of claim 4, wherein the software compares a duty of data output from the display port timing controller with a duty of reference data stored in the memory in response to the test signal comprising a pulse having a duty adjusted in stages, which is output from the field programmable gate array, to test normality of the luminance up/down of the display panel.

6. The device of claim 1, wherein when an error mode transition test is selected by the software, the field programmable gate array applies the test signal comprising a frequency out of a normal range to the display port timing controller to test normality of the error mode transition of the display panel.

7. The device of claim 1, wherein the connecting signals comprise:
   main link signals transmitted through a main channel to connect the display port timing controller with the display port transmitting part; and
   control signals transmitted through an auxiliary channel to control the display port timing controller.

8. The device of claim 7, wherein when a low power mode transition test is selected by the software, the field programmable gate array blocks the main link signals to test normality of the low power mode transition of the display panel.

9. The device of claim 7, wherein when a built-in self-test mode transition test is selected by the software, the field programmable gate array blocks the control signals to test normality of the built-in self test mode transition of the display panel.

10. The device of claim 1, wherein when a safe mode transition test is selected by the software, the field programmable gate array applies the test signal of starting video distribution amplification to the display port timing controller to test normality of the safe mode transition of the display panel.

11. The device of claim 1, wherein when a diagnostic mode transition test is selected by the software, the field programmable gate array applies the test signal comprising a diagnostic pulse to the display port timing controller to test normality of the diagnostic mode transition to the display panel.

12. A system for testing a display port function, the system comprising:
   a display panel comprising a display port timing controller;
   a device to test the display port function including:
   a display port transmitting part to transmit connecting signals to the display port timing controller;
   a field programmable gate array to apply a test signal to the display port timing controller and control the connecting signals applied from the display port transmitting part to the display port timing controller; and
   a memory comprising a software that determines acceptance or rejection of display port function based on data outputted from the display port timing controller, the data being output in response to the connecting signals or the test signal; and
   a display port cable connecting the display port timing controller to the device for testing the display port function.

13. The system of claim 12, wherein the software tests at least one item selected from the group consisting of a power on/off test, a luminance up/down test, a safe mode transition test, a built-in self-test mode transition test, a diagnostic mode transition test, a low power mode transition test, and an error mode transition test.

14. A method of testing function of a display port, the method comprising:
   selecting a power on/off test;
   applying a first test signal comprising a power on/off pulse to a display port timing controller mounted on a display panel;
   outputting first data from the display port timing controller based on the first test signal; and
   determining normality of the power on/off of the display panel based on the first data.

15. The method of claim 14, further comprising:
   selecting a luminance up/down test;
   applying a second test signal comprising a duty adjusted in stages to the display port timing controller;
   outputting second data from the display port timing controller based on the second test signal; and
   comparing the duty of the second data with a duty of reference data to test normality of the luminance up/down of the display panel.

16. The method of claim 14, further comprising:
   selecting an error mode transition test;
   applying a second test signal comprising a frequency out of a normal range to the display port timing controller;
   outputting second data from the display port timing controller based on the second test signal; and
   determining normality of the error mode transition of the display panel based on the second data.

17. The method of claim 14, further comprising:
   selecting a low power mode transition test;
   blocking application of the main link signals to the display port timing controller;
   outputting second data from the display port timing controller based on the blocking of the main link signals; and determining normality of the low power mode transition of the display panel based on the second data.

18. The method of claim 14, further comprising:

selecting a built-in self-test mode transition test;

blocking application of control signals to the display port timing controller;

outputting second data from the display port timing controller based on the blocking of the main link signals; and determining normality of the built-in self test mode transition of the display panel based on the second data.

19. The method of claim 14, further comprising:

selecting a safe mode transition test;

applying a second test signal for starting video distribution amplification to the display port timing controller;

outputting second data from the display port timing controller based on the second test signal; and determining normality of the safe mode transition of the display panel based on the second data.

20. The method of claim 14, further comprising:

selecting a diagnostic mode transition test;

applying a second test signal comprising a diagnostic pulse to the display port timing controller;

outputting second data from the display port timing controller based on the second test signal; and determining normality of the diagnostic mode transition of the display panel based on the second data.

* * * * *